June 20, 1961  S. M. WENGEL  2,989,653
ELECTRIC MOTOR
Filed Nov. 5, 1957  2 Sheets-Sheet 1
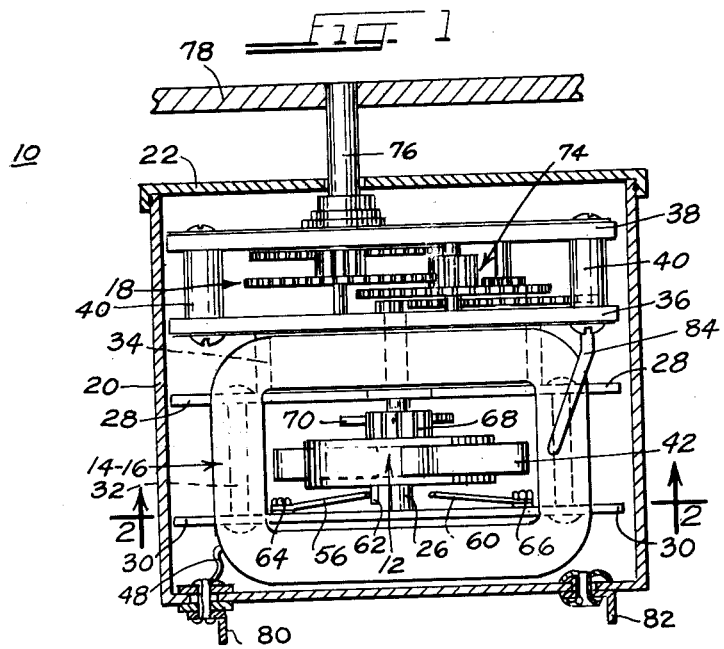
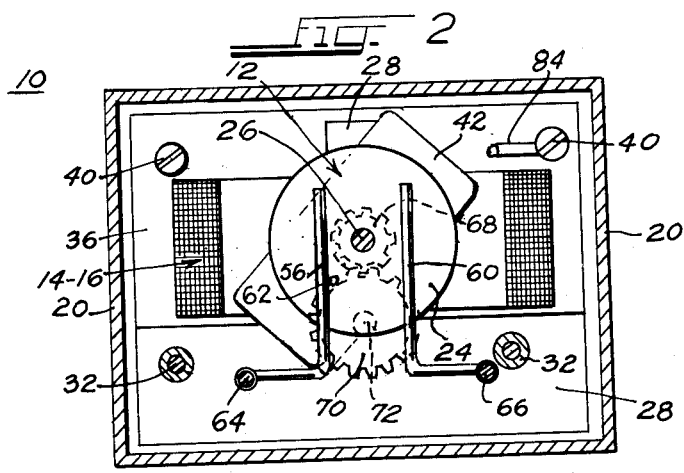
INVENTOR.
SHELDON M. WENGEL
BY
Smith, Prangley, Baird and Clayton
ATTY'S.

June 20, 1961 S. M. WENGEL 2,989,653
ELECTRIC MOTOR
Filed Nov. 5, 1957 2 Sheets—Sheet 2
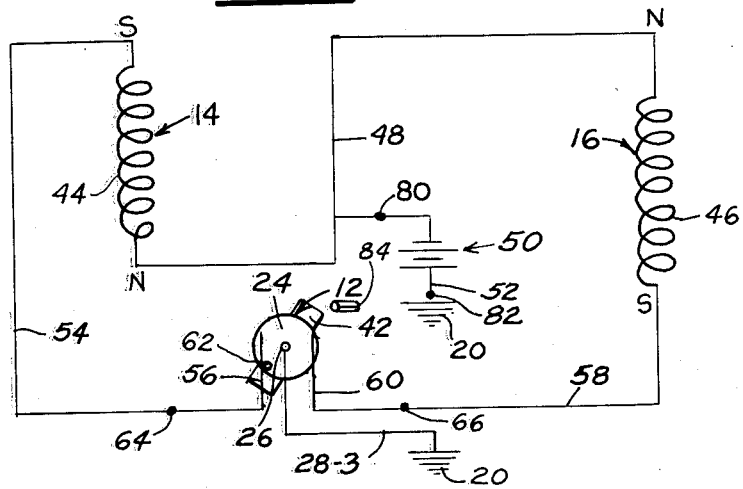
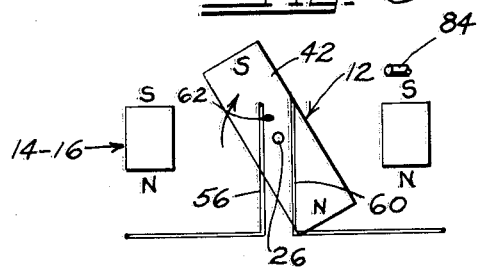
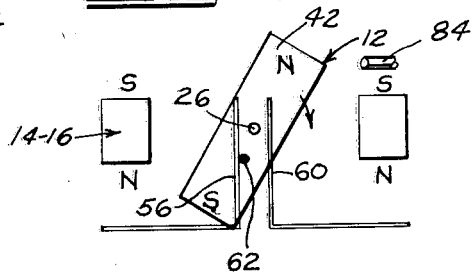
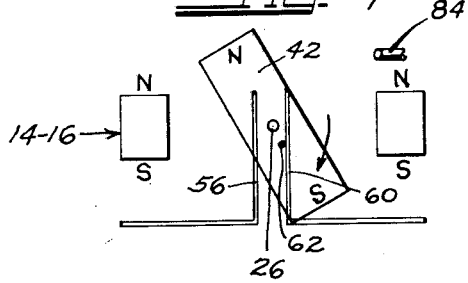
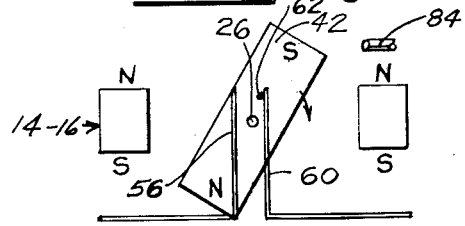
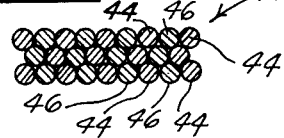
INVENTOR.
SHELDON M. WENGEL
BY

United States Patent Office 2,989,653
Patented June 20, 1961

2,989,653
ELECTRIC MOTOR
Sheldon M. Wengel, Hankscraft Company, Reedsburg, Wis.
Filed Nov. 5, 1957, Ser. No. 694,547
5 Claims. (Cl. 310—46)

This invention relates to small electric motors and particularly to such motors of the impulse type.

The motor of the present invention is of the type wherein a permanent magnet is mounted upon a rotating armature adjacent to a pair of coils. The coils are arranged and connected so that when energized they provide magnetic fields of opposite polarity. Rotation of the armature serves alternately to connect and disconnect the two coils whereby to provide an electromotive field to drive the rotatable armature. Serious problems have been encountered heretofore in providing such motors with contacts having long useful lives. It also has been difficult to provide such motors which will always start when energized after having been stopped.

Accordingly, it is an important object of the present invention to provide an improved electric motor of the impulse type and particularly a motor of the impulse type which has a long useful life.

In connection with the foregoing object, it is another object of the invention to provide a motor of the type set forth having an improved arrangement and placement of the contacts for interconnecting the source of electrical energy to the stationary field coils.

Yet another object of the invention is to provide, in a motor of the type set forth, an improved construction and placement of the contacts for alternately interconnecting the field coils and the source of potential which suppresses arcing at the contacts.

Still another object of the invention is to provide in a motor of the type set forth, improved means to insure that the motor will be started upon application of operating potential thereto after the motor has been stopped.

Yet another object of the invention is to provide a motor of the type set forth which has a high output torque proportional to its size and which, however, utilizes a very small amount of electrical energy whereby to provide increased efficiency.

Still another object of the invention is to provide in a motor of the type set forth an improved arrangement of the rotating permanent magnet with respect to the stationary field coils and an improved arrangement of the coils with respect to each other whereby to increase the operating torque and efficiency of the motor.

A further object of the invention is to provide an improved motor of the type set forth which is more simple in construction and less expensive in manufacture and operation than prior motors of comparable kinds.

These and other objects and advantages of the invention will be better understood from the following description when taken in conjunction with the accompanying drawings. In the drawings, wherein like reference numerals have been utilized to designate like parts throughout:

FIGURE 1 is an enlarged view, in horizontal section, of a motor made in accordance with and embodying the principles of the present invention;

FIGURE 2 is a view in vertical section through the motor of FIGURE 1 substantially as seen in the direction of the arrows along the line 2—2 of FIGURE 1;

FIGURE 3 is a simplified schematic electrical diagram of the motor of FIGURE 1;

FIGURES 4, 5, 6 and 7 are diagrammatic views illustrating the method of operation of the motor of FIGURE 1; and FIGURE 8 is a fragmentary view in section through a portion of the stationary field coils of the motor of FIGURE 1 and illustrating the alternate placement of the windings thereof.

There is illustrated in FIGURES 1 and 2 of the drawings a motor generally designated by the numeral 10 made in accordance with and embodying the principles of the present invention. Motor 10 includes an armature 12 and a pair of interwound stationary field coils 14—16. These parts, together with a gear reducing train generally designated by the numeral 18, are all enclosed within a housing 20 which is rectangular in shape and provided with a removable cover 22. The housing 20 and the cover 22 are preferably formed of a non-magnetic material such as aluminum.

The armature 12 includes a substantially cylindrical magnet holder 24 which is carried by a shaft 26 rotatably mounted in a pair of mounting plates 28 and 30. The mounting plates 28 and 30 are interconnected by a pair of supports 32 and are in turn connected through the plate 28 and supports 34 to a frame member 36 for the gear reducing mechanism 18. A second frame member 38 is provided for the gear reducing mechanism 18, the frame members 36 and 38 being interconnected by support members 40. The assembly of the mounting plates 28—30 and the frame members 36—38 is mounted within the housing 20, as illustrated.

From the above description it will be seen that the shaft 26 is mounted to rotate upon and be supported by the mounting plates 28 and 30. Mounted upon the magnet holder 24 is a permanent magnet 42 which may be for example approximately 1 inch long, ½ inch wide and ⅛ inch thick. A suitable magnet for this purpose is one sold under the designation "Alnico V."

Positioned about armature 12 is the double interwound coil 14—16. The coil 14—16 may be for example 1½ inches long, as viewed in FIGURE 1, approximately 1 inch wide and approximately ½ inch high as viewed in FIGURE 2. Such a coil may be formed by simultaneously winding on a suitable rectangular removable core 750 turns of No. 35 plain enamel magnet wire for each coil. Preferably these two sets of wires are wound simultaneously whereby each layer of coil 14—16 contains alternate wires of the coils. For example, as illustrated in FIGURE 8 of the drawings which is an enlarged cross sectional view through the coil 14—16, a turn 44 of the coil 14 alternates with a turn 46 of the coil 16 in each layer of the composite coil 14—16.

As may be best seen in FIGURES 1 and 2 of the drawings, the opening in the coil 14—16 receives therein the armature 12 and the distance between the opposite interior sides of the coil 14—16 is sufficient to permit rotation of the armature 12 therein and particularly to give clearance for the ends of the permanent magnet 42. Preferably the permanent magnet 42 is positioned to rotate substantially in the center of the opening in the coil 14—16 so that the permanent magnet field from the magnet 42 is confined substantially within the confines of the stationary field coil 14—16. This assures that the maximum flux density of the field coil 14—16 is cut by the field of the permanent magnet 42 and vice versa. Furthermore, the field coil 14—16 is so wound and arranged that the field therefrom is exactly at right angles to the axis of rotation of the permanent magnet 42. This assures maximum efficiency of operation.

Means is provided alternately to energize the coils 14 and 16 and to energize these coils such that the polarity of the magnetic fields generated thereby are opposed. More specifically, one end of the coil 14 is connected to one end of the coil 16 (see the electrical wiring diagram in FIGURE 3) by a wire 48. The wire 48 is in turn connected to one terminal of a battery 50. The other terminal of the battery 50 is connected by a wire 52 to a ground, which normally is the housing 20. The second end of the coil 14 is connected through a wire 54 to a flexible contact 56, and the second end of the coil 16 is connected through a line 58 to a second flexible stationary contact 60. The stationary flexible contacts 56—60 are adapted to be contacted by a rotating contact 62 which is mounted on the magnet mounting or holder 24. More specifically, when the parts are dimensioned as described above, the movable contact 62 is positioned approximately 3/16 inch from the center of rotation of the axis of the shaft 26. Shaft 26 is connected to the common ground or housing 20 by means of its contact with the mounting plates 28—30 which are formed of electrical conductive materials and are in electrical contact with the housing 20.

Referring more specifically to FIGURES 1 and 2 of the drawings, the physical construction of the stationary flexible contacts 56 and 60 will now be described in greater detail. Contact 56 is mounted upon the mounting plate 30 by means of a connector 64 which may be in the form of a nut and bolt. The contact 60 is similarly connected to the plate 30 by a connector 66. The operative portions of the contacts 56 and 60 are resilient and are positioned such that they make contact with the movable contact 62 as the armature 12 is rotated.

It will be observed that the shaft 26 also carries an output gear 68 which meshes with a gear 70, and the gear 70 is mounted on and drives a shaft 72 which connects with the gear reducing mechanism 18. The gear reducing mechanism 18 includes a conventional gear train 74 having an output shaft 76 to which the load to be driven by motor 10 is connected. For purposes of illustration, a member 78 has been shown mounted upon the shaft 76, and this member 78 may be, for example, part of a moving sign display.

For the sake of convenience, the line 48 is connected to a motor terminal 80 which is insulated from the housing 20 and is positioned outside thereof for easy connection to the battery 50. A common or ground terminal 82 is also provided on the housing 20 and is in electrical contact therewith.

Referring now specifically to FIGURES 4 through 7 of the drawings, the operation of the motor 10 will be described in detail. By means which will be described more fully hereinafter, the armature 12, and more specifically the permanent magnet 42 mounted thereon, is always stopped in a position such that the axis thereof is disposed at an angle of approximately 40° with respect to the perpendicular when the parts are in the position illustrated in FIGURE 4 of the drawings. The movable contact 62 in this position is in electrical contact with the stationary flexible contact 56. The contact 56 is so constructed that it will remain in connection with the contact 62 until the axis of the magnet 42 moves to a position substantially 20° from the vertical. Therefore a good firm electrical contact is provided between the contacts 56 and 62. The connections are such and the armature 12 is positioned so that the north pole of the magnet 42 is positioned upwardly in FIGURE 4 if the coil 14 is to be energized whereby to provide a south pole upwardly and a north pole thereof downwardly when connection is made thereto from the contact 56 through ground to the battery 50. As soon as the coil 14—16 is energized there will be a mutual attraction between the north pole of the coil and the adjacent south pole of the magnet 42, thereby tending to rotate the armature 12 in a clockwise direction as viewed in FIGURE 4. Connection will be made between the contact 62 and the contact 56 for approximately 140° of rotation whereby to give a sufficient starting impulse to the armature 12. When the armature 12 arrives at a point spaced approximately 20° from the vertical (see FIG. 5) the connection between the contacts 56 and 62 will be broken.

Inertia of the armature 12 will cause it to rotate then 20° past the vertical in a clockwise direction whereby to position the south pole of the magnet 42 upwardly as shown in FIGURE 6 of the drawings. At this time electrical connection is made between the contacts 60 and 62 whereby to energize the coil 16. The coil 16 is arranged so that the north pole of the field thereof is positioned upwardly and the south pole downwardly. Accordingly, there will be a mutual attraction between the north pole of the permanent magnet 42 and the south pole of the field of the coil 16. This attractive force will cause continued rotation of the armature 12 until the axis of the magnet 42 passes the horizontal position. At this time, the attractive force between the fields becomes repulsive but the inertia of the armature 12 will nevertheless carry it to the position illustrated in FIGURE 7. At this time it will be seen that the repulsive force will be aiding rotation of the armature 12 whereby to give additional impetus to the movement of the armature 12. The contact 62 will be in electrical connection with the contact 60 for approximately 140° of revolution and will lose electrical connection therebetween when the axis of the magnet 42 is approximately 20° from the vertical.

The inertia of the armature 12 will carry it until it reaches a position 20° past the vertical at which time the moving contact 62 again makes electrical connection with the stationary contact 56 as illustrated in FIGURE 4 of the drawings. The polarity of the field coil 14—16 will now be changed because the coil 16 will be de-energized and the coil 14 energized. As a result, there will again be a strong attractive force urging the armature 12 in the direction of rotation thereof. This attractive force will be acting until the axis of the magnet 42 crosses the horizontal position, at which time a repulsive force will come into action. The inertia of the armature 12 is sufficient, however, to carry it to a position substantially like that shown in FIGURE 5 of the drawings wherein a repulsive force aiding rotation of the armature 12 will once again come into play. Contact 62 will be in electrical connection with the contact 56 for approximately 140° of rotation of the armature 12.

The cycle of operation described above will at this time be begun again and will be repeated as described above. When the parts are dimensioned and arranged as described above, the battery 52 may comprise two flashlight-type dry cell batteries. Such batteries will drive the armature 12 at a rate of approximately 1000 r.p.m. A torque of 34 inch-ounces can be produced and it has been found that the motor 10 can be operated under normal load conditions as long as a month and a half on two such flashlight-type dry cell batteries.

An important feature of the present invention resides in the fact that there is substantially little or no arcing between the movable contact 62 and the stationary flexible contacts 56 and 60. Good contacting characteristics and long wear are imparted to these contacts by making the movable contact 62 of silver and the flexible contacts 56 and 60 of Phosphor bronze. It is believed that the reduction and substantial elimination of the arcing at the contacts results at least in part from the positioning of the contacts in the center of the field of the stationary coil 14—16. It further is believed that the winding and intimate intermeshing of the turns of the coils 14 and 16 produces a combination of electromotive forces tending to suppress arcing at the contacts.

Still another important feature of the invention is the provision of means to insure starting when electrical potential is applied to the terminals 80 and 82. To this end there is provided an arm 84 which is mounted on the frame member 36 and positioned adjacent the path of travel of the end of the magnet 42. More specifically the arm 84 is formed of magnetic material and is positioned such that the magnet 42 will be attracted thereto and positioned thereby when no driving force is supplied by the field coils 14—16. The arm 84 will hold the magnet 42 in a position such that the axis of the magnet 42 is disposed at an angle of 40° with respect to the perpendicular as viewed in FIGURE 4 of the drawings. This automatic positioning of the magnet 42 insures that the armature 12 will begin rotating, as described above, when operating potentials are applied to the terminals 80 and 82.

It will be seen that there has been provided a motor which fulfills all of the objects and advantages set forth above. Although one preferred form of the invention has been described for purposes of illustration, it is to be understood that various changes and modifications may be made therein without departing from the spirit and scope of the invention. Accordingly, the invention is to be limited only as set forth in the following claims.

I claim:

1. An impulse type direct current electrical motor adapted to be driven by small direct current batteries comprising a permanent magnet mounted for rotation about an axis perpendicular to the polar axis of said magnet, a pair of coils intimately interwound to provide a stationary air core type field magnet encircling the path of rotation of said permanent magnet and having no magnetic materials forming a core therewith, a movable contact mounted for rotation with said permanent magnet within the physical confines of said field coil at all times, means to connect the small direct current batteries as a source of energizing potential for said field coils between one of the terminals of each of said field coils and said movable contact, and a pair of spaced apart stationary contacts positioned within the physical confines of said field coil at all times alternately to connect with said movable contact, one of said stationary contacts being connected to the other terminal of one of said field coils and the other of said stationary contacts being connected to the other terminal of the other of said field coils whereby to energize the associated field coil upon connection with said movable contact, said coils being connected to provide magnetic fields of opposite polarity when energized, the axes of the fields generated by said coils being perpendicular to the axis of rotation of the field of said permanent magnet and positioned centrally with respect thereto, the positioning of all of said contacts within the physical confines of said field coils at all times including the entire times of contact between said movable contact and said stationary contacts in combination with said air core type field coil serving to suppress arcing between said contacts.

2. The electrical motor set forth in claim 1, wherein a member formed of magnetic material is mounted adjacent to the path of rotation of said permanent magnet to stop and to hold said permanent magnet in a position to place said movable contact in connection with one of said stationary contacts to insure starting of the motor upon initial application of energizing potential thereto.

3. An impulse type direct current electrical motor adapted to be driven by small direct current batteries, comprising a permanent magnet mounted for rotation about an axis perpendicular to the polar axis of said magnet, a pair of coils intimately interwound to provide a stationary air core type field magnet encircling the path of rotation of said permanent magnet and having no magnetic materials forming a core therewith, the turns of said coils being alternated in each layer of the field coil to provide high mutual inductance therebetween, a movable contact mounted for rotation with said permanent magnet within the physical confines of said field coil at all times, means to connect the small direct current batteries as a source of energizing potential for said field coils between one of the terminals of each of said field coils and said movable contact, and a pair of spaced apart stationary contacts positioned within the physical confines of said field coil at all times alternately to connect with said movable contact, one of said stationary contacts being connected to the other terminal of one of said field coils and the other of said stationary contacts being connected to the other terminal of the other of said field coils whereby to energize the associated field coil upon connecion with said movable contact, said coils being connected to provide magnetic fields of opposite polarity when energized, the axes of the fields generated by said coils being perpendicular to the axis of rotation of the field of said permanent magnet and positioned centrally with respect thereto, the positioning of all of said contacts within the physical confines of said field coils at all times including the entire times of contact between said movable contact and said stationary contacts in combination with said air core type field coil and the alternated turns of said field coil serving to suppress arcing between said contacts.

4. An impulse type direct current electrical motor adapted to be driven by small direct current batteries, comprising a permanent magnet mounted for rotation about an axis perpendicular to the polar axis of said magnet, a pair of coils intimately interwound to provide a stationary air core type field magnet encircling the path of rotation of said permanent magnet and having no magnetic materials forming a core therewith, the turns of said coils being alternated in each layer of the field coil to provide high mutual inductance therebetween, a movable contact mounted for rotation with said permanent magnet within the physical confines of said field coil at all times, said movable contact being mounted along the polar axis of said permanent magnet and spaced from the rotational axis thereof, means to connect the small direct current batteries as a source of energizing potential for said field coils between one of the terminals of each of said field coils and said movable contact, and a pair of spaced apart stationary contacts positioned within the physical confines of said field coil at all times alternately to connect with said movable contact, one of said stationary contacts being connected to the other terminal of one of said field coils and the other of said stationary contacts being connected to the other terminal of the other of said field coils whereby to energize the associated field coil upon connection with said movable contact, said coils being connected to provide magnetic fields of opposite polarity when energized, the axes of the fields generated by said coils being perpendicular to the axis of rotation of the field of said permanent magnet and positioned centrally with respect thereto, the positioning of all of said contacts within the physical confines of said field coils at all times including the entire times of contact between said movable contact and said stationary contacts in combination with said air core type field coil and the alternated turns of said field coil serving to suppress arcing between said contacts.

5. An impulse type direct current electrical motor adapted to be driven by small direct current batteries, comprising a permanent magnet mounted for rotation about an axis perpendicular to the polar axis of said magnet, a pair of coils intimately interwound to provide a stationary air core type field magnet encircling the path of rotation of said permanent magnet and having no magnetic materials forming a core therewith, the turns of said coils being alternated in each layer of the field coil to provide high mutual inductance therebetween, a movable contact formed of silver mounted for rotation with said permanent magnet within the physical confines of said field coil at all times, said movable contact being mounted along the polar axis of said permanent magnet and spaced from the rotational axis thereof, means to connect the small direct current batteries as a source of energizing potential for said field coils between one of the terminals of each of said field coils and said movable contact, and a pair of spaced apart stationary contacts formed of Phosphor bronze positioned within the physical confines of said field coil at all times alternately to connect with said movable contact, one of said stationary contacts being connected to the other terminal of one of said field coils and the other of said stationary contacts being connected to the other terminal of the other of said field coils whereby to energize the associated field coil upon connection with said movable contact, each of said stationary contacts being in electrical connection with said movable contact for approximately 140° of revolution of said permanent magnet, said coils being connected to provide magnetic fields of opposite polarity when energized, the axes of the fields generated by said coils being perpendicular to the axis of rotation of the field of said permanent magnet and positioned centrally with respect thereto, the positioning of all of said contacts within the physical confines of said field coils at all times including the entire times of contact between said movable contact and said stationary contacts in combination with said air core type field coil and the alternated turns of said field coil serving to suppress arcing between said contacts.

References Cited in the file of this patent

UNITED STATES PATENTS

| | | |
|---|---|---|
| 271,042 | Curtis et al. | Jan. 23, 1883 |
| 2,181,842 | MacKay | Nov. 28, 1939 |
| 2,247,966 | Root | July 1, 1941 |
| 2,437,428 | Hornbostel | Mar. 9, 1948 |